Dec. 17, 1968   W. H. HITTENBERGER ETAL   3,416,411
METHOD OF HEAT BONDING PANELS OF PAPERBOARD
HAVING A THERMOPLASTIC COATING
Filed Feb. 25, 1965   6 Sheets-Sheet 1

INVENTOR.
William H. Hittenberger
Kenneth C. Gobalet
BY Thomas R. Baker

Howard G. Russell
their ATTORNEY

Dec. 17, 1968 W. H. HITTENBERGER ET AL 3,416,411
METHOD OF HEAT BONDING PANELS OF PAPERBOARD
HAVING A THERMOPLASTIC COATING
Filed Feb. 25, 1965 6 Sheets-Sheet 3

INVENTOR.
William H. Hittenberger
Kenneth C. Gobalet
BY Thomas R. Baker

Howard G. Russell
their ATTORNEY

INVENTOR.
William H. Hittenberger
Kenneth C. Gobalet
BY Thomas R. Baker

Howard G. Russell
their ATTORNEY

3,416,411
METHOD OF HEAT BONDING PANELS OF PAPERBOARD HAVING A THERMOPLASTIC COATING

William H. Hittenberger, Santa Clara, Kenneth C. Gobalet, Redwood City, and Thomas R. Baker, Los Altos, Calif., assignors to Kliklok Corporation, New York, N.Y., a corporation of Delaware
Filed Feb. 25, 1965, Ser. No. 435,281
4 Claims. (Cl. 93—36)

ABSTRACT OF THE DISCLOSURE

The present improvements provide a method for sealing, by application of heat, overlapping closure panels of a folding box made from paperboard having an extremely thin coating of moisture-proofing thermoplastic material on opposite surfaces. Heated air is directed at the surfaces to be bonded, the temperature of the air at the point of impact on the surfaces being above the char point of the board. The duration of application of heat is made so brief, by a corresponding high rate of advance of the boxes through the air stream, that the coating on the reverse side of the panels remains substantially non-tacky. The bond is formed immediately after heating within a period of time for any one surface point less than the total time of exposure to heated air of that point. Under such conditions the heat applied to soften the thermoplastic coating is dissipated after completion of the bond by absorption into the board acting as a heat sink without the need for cooling devices.

---

This invention relates to improvements in the bonding, by heat and a certain amount of pressure, of panels of paperboard having a thermoplastic coating. A principal application of the heat bonding procedure is the closing and sealing of filled boxes of paperboard, for example by bonding cover flaps to the respective side walls of the box body. But the present invention has also application to bonding of box corner portions in the process of setting up a previously flat blank into hollow box form.

In the field of frozen food packaging paperboard boxes are favored which are coated on both sides with a thermoplastic coating. This coating may be composed of a wax composition having a high melting point. Such compositions are commercially available from practically all major oil refining companies and possess the property of imparting high moisture-vapor resistance and even liquid proofness to the board. Such waxes may be applied with a high gloss finish which enhances the appearance of multicolor lithographic art work on the board.

Coatings of a synthetic resin base, such as polyethylene coatings, possess similar properties and are suitable for the same purposes.

These thermoplastic coatings are quite thin, but in spite of their thinnness they are capable of forming a fiber-tearing bond, if appropriately handled. In order to produce a bond the board coating must of course be put in a condition of tackiness by application of heat. This poses numerous problems such as the following:

Application of heat to the side of the board which is to be bonded usually also melts the coating on the opposite side. This mars the surface by destroying the gloss of the finish and producing a generally streaky appearance.

If sealing pressure is applied to the said opposite side, the pressure applying elements of the box closing machine pick up melted coating in increasing amounts. This leads to smearing of the boxes and necessitates periodic shut-downs of the closing machine in order to clean the pressure applicators.

If heat is applied for too long a period of time, the coating simply disappears by wicking into the board. Wicking is a problem particularly experienced when the coating is softened by radiant heating means.

The present invention avoids the aforementioned problems and provides a bonding method capable of extraordinary production rates.

The invention employs heated air as a means of softening the thermoplastic board coating. The use of heated air for softening thermoplastic board coating is basically known, but the present invention departs from the known procedures in a number of significant aspects.

The air is discharged against the board at a temperature above the char point of the board and only for an extremely short period, the period being so short that there is no significant heat accumulation in, or heat transfer through, the board. The resulting advantages are twofold.

Firstly, the coating on the opposite side is not melted and consequently not marred by the contact therewith of pressure applying elements such as rails or rollers which apply sealing pressure. As a further consequence no coating accumulates on the pressure applying elements.

Secondly, no significant amount of heat is absorbed by the board which must then be dissipated before the bond becomes permanent.

Thirdly, the capacity of the board to absorb heat is taken advantage of to dissipate the relatively small amount of heat energy imparted to the coating. The board becomes, in effect, a heat sink into which the heat disappears quickly. Consequently the period of compression may be extremely brief. This contributes to the high production rates of which the present method is capable.

For example, boxes may be sealed at the rate of 120 to 210 boxes per minute, and even higher rates while traveling at linear velocities of between 18 to 32 inches per second (45 to 75 cm./sec. metric), and higher.

A part of the present sealing method is the folding of the board portions into sealing contact within less time from the moment of exposure to the hot air than the time of exposure to the hot air of any given point of the portions. The significance of this step is to produce the board contact before the heat-sink-action of the board itself, thin though the board may be, becomes operative in then quickly reducing the coating temperature below the solidification point.

These and other aspects, features and advantages of this invention will become even more apparent from the detailed description which follows, accompanied by drawings showing, for the purpose of illustration, a representative form of machine or device capable of performing the present method. The invention resides in certain new and original steps and sequence of steps.

Although the characteristic features of this invention which are believed to be novel will be particularly pointed out in the claims appended hereto, the invention itself, its objects and advantages and the manner in which it may be carried out may be better understood by referring to the following description taken in connection with the accompanying drawings forming a part of it in which:

Figure 2:
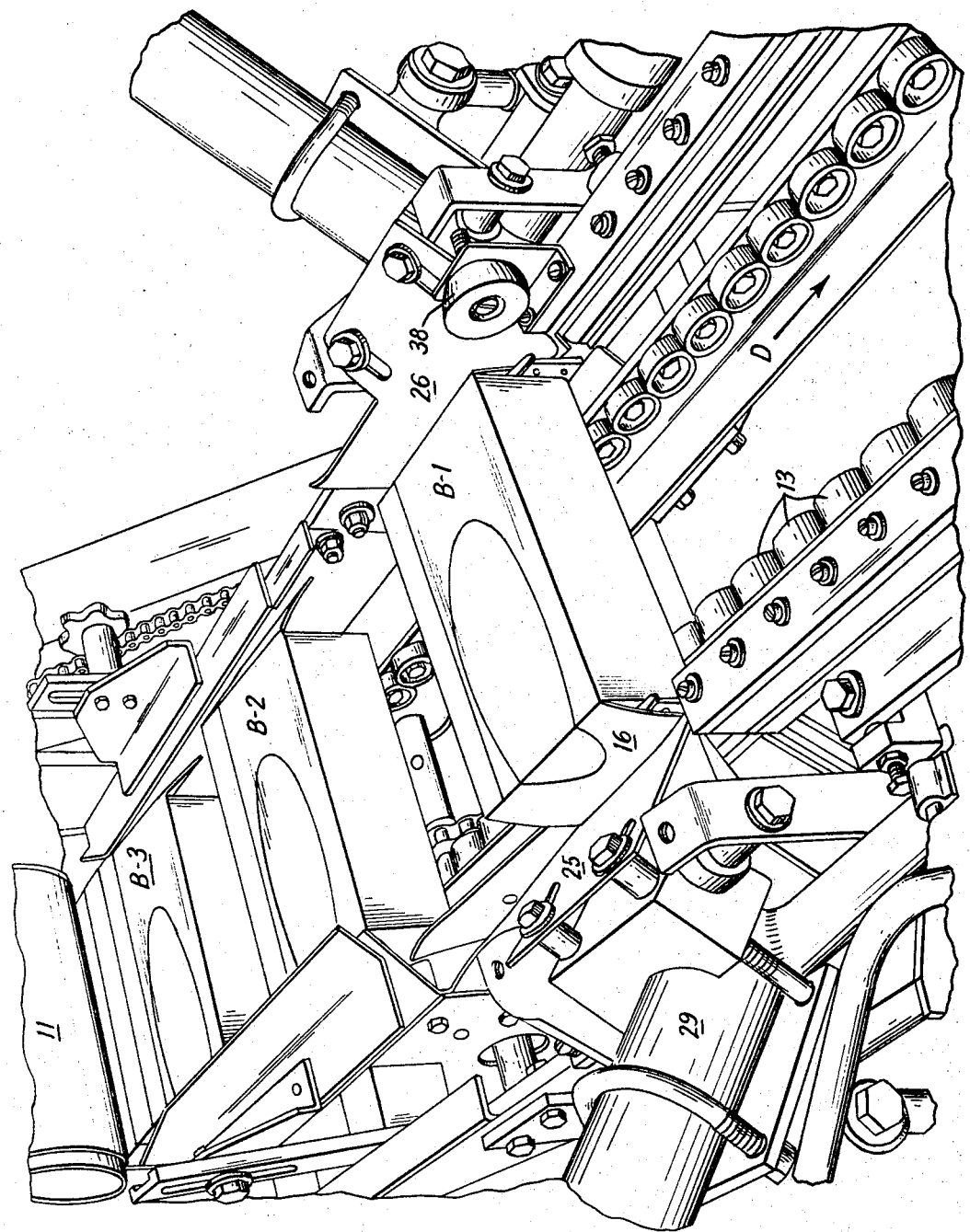
FIG. 2 is a perspective view of the track at a later moment at which heat is being applied to the first box.
Figure 3:
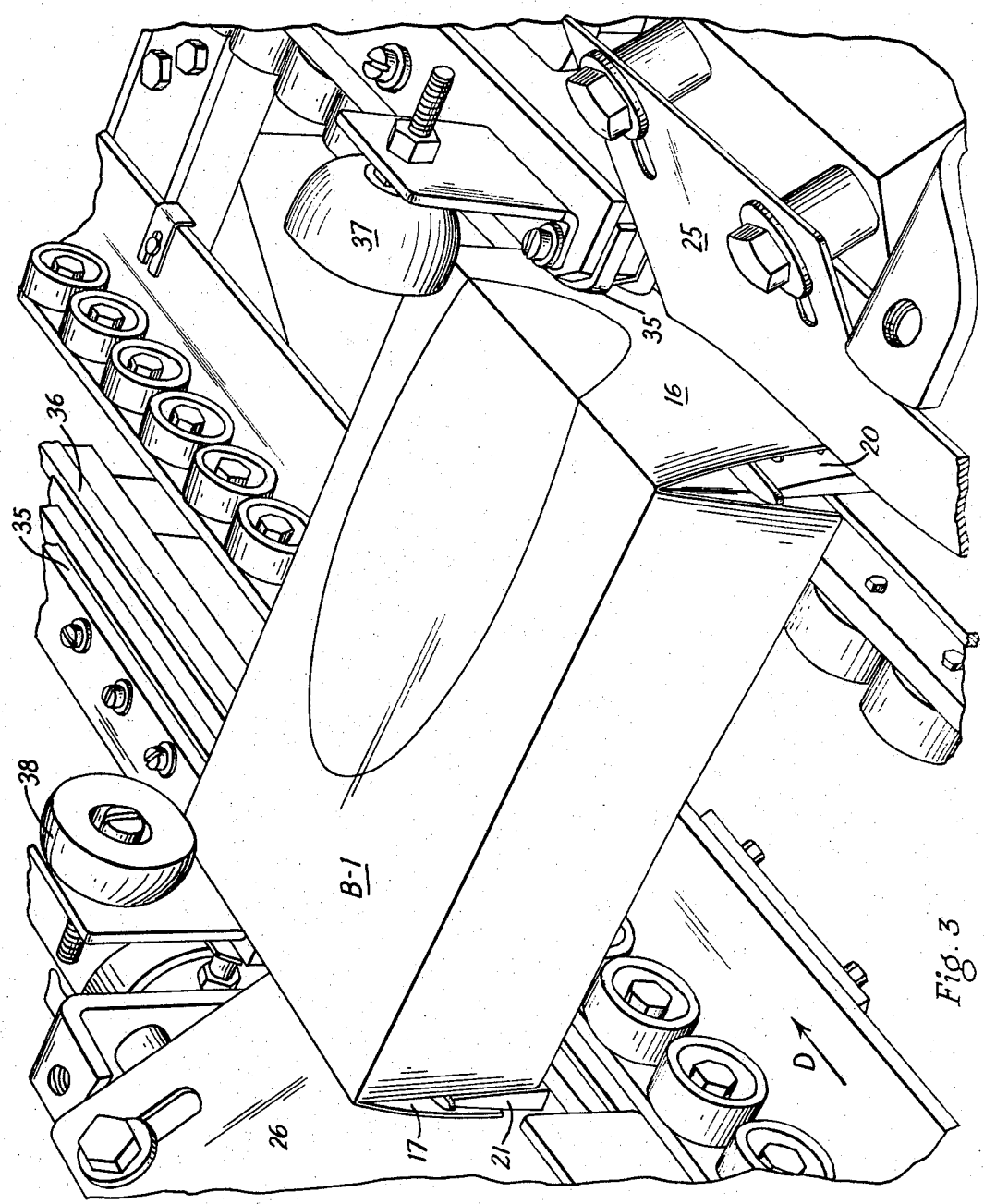
FIG. 3 is a perspective view of the conveyor track in a downstream direction, the box being shown at the moment of departure from the heat applicator and entry into a folding and compression device.
Figure 4:
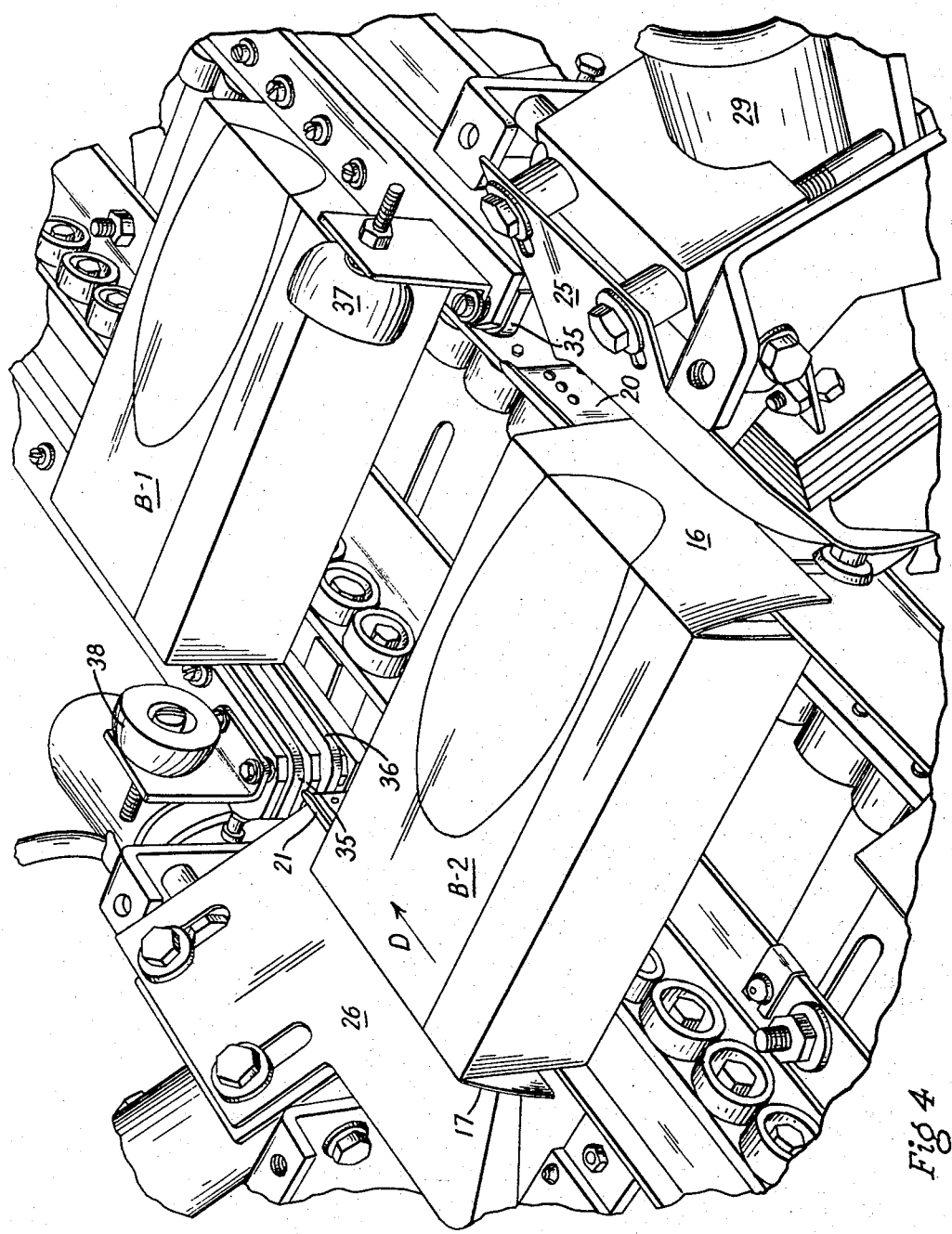
FIG. 4 shows the same conveyor track portion as FIG. 3 but at a later moment at which the box to the right has entered the compression device and the box at the left is moving into the heating device.
Figure 5:
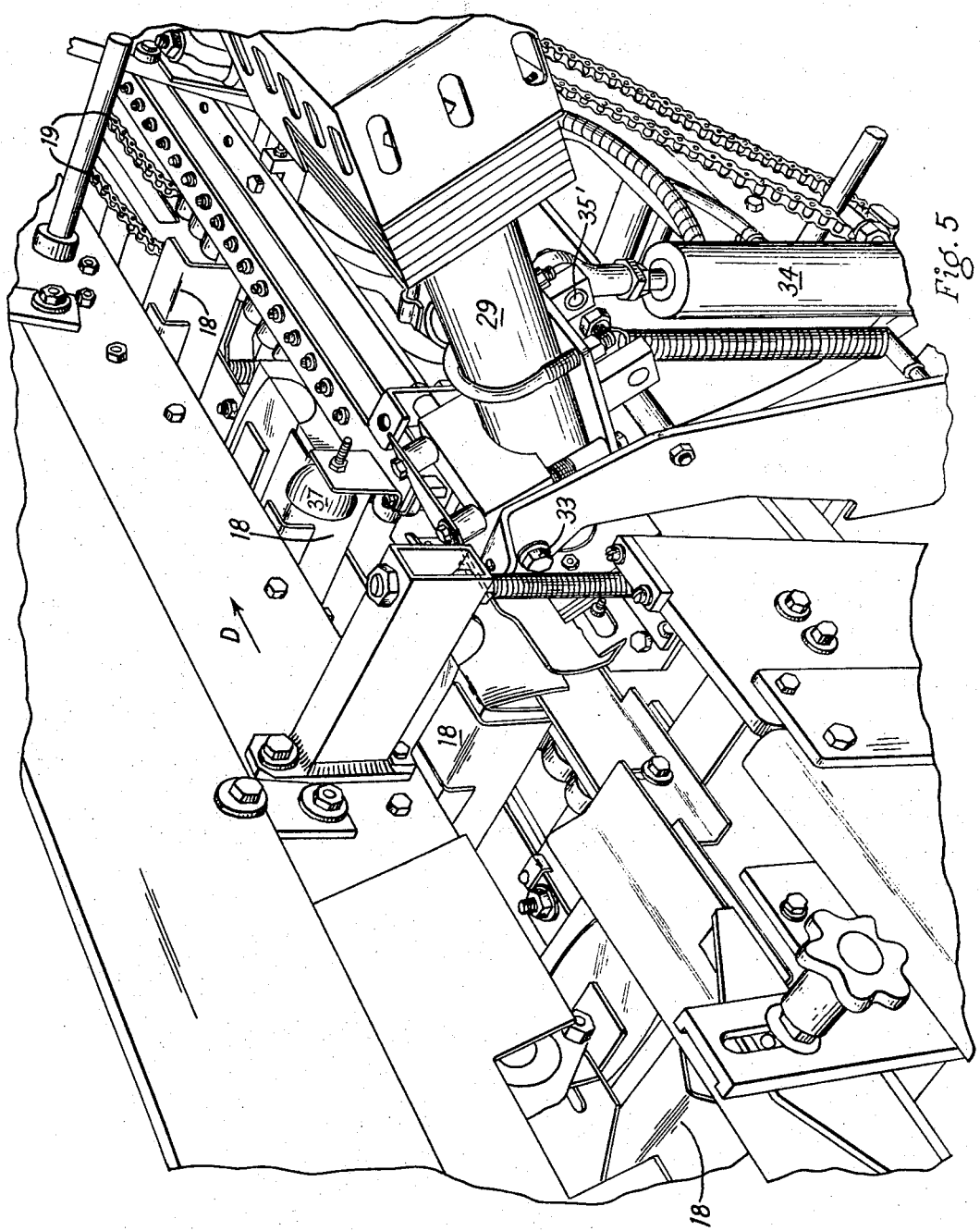
Figure 6:
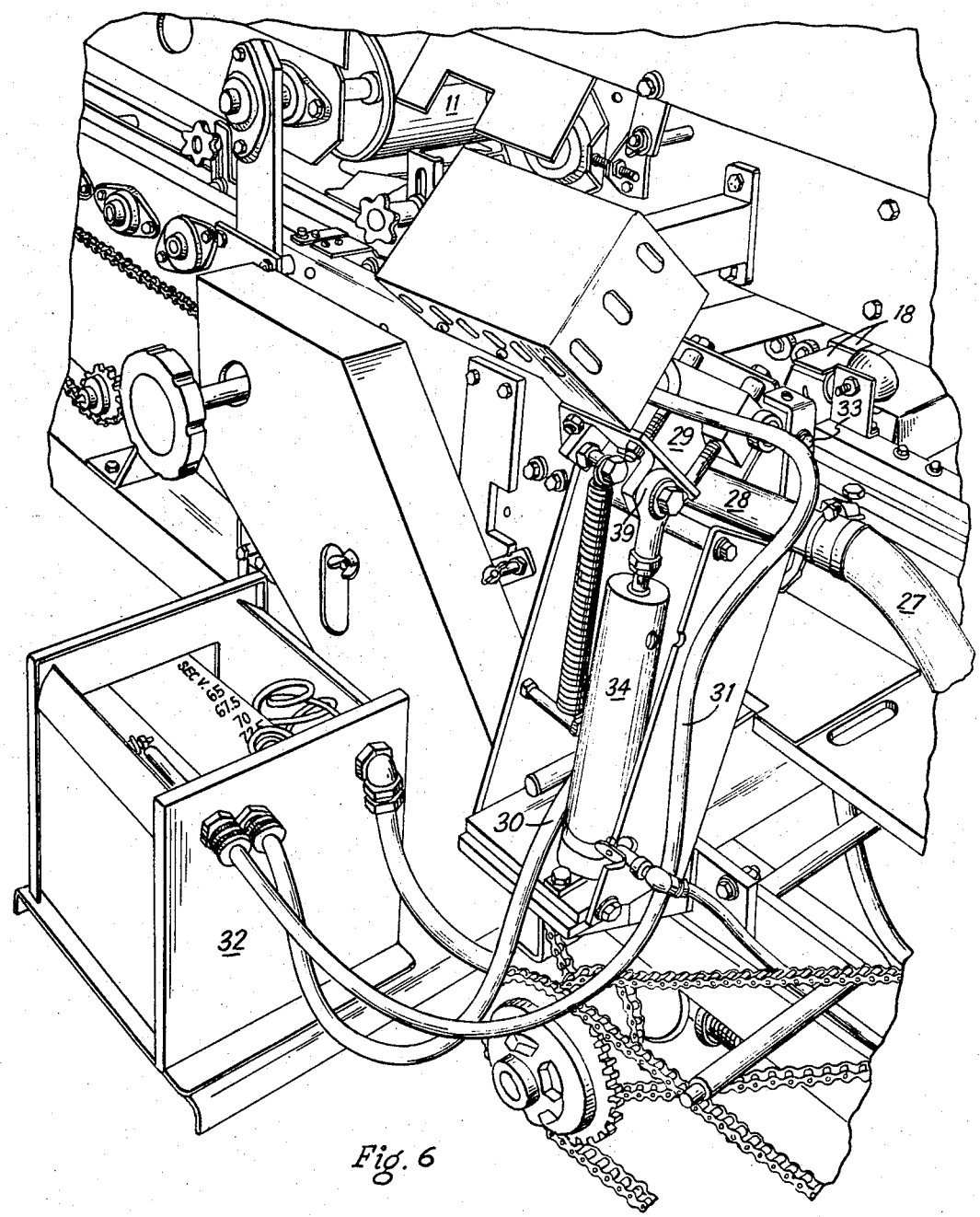

FIG. 5 is a perspective view of the machine shown in FIG. 1 to 4, the observer having taken one step back with respect to his position in FIG. 4. In this view an overhead conveyor, which was swung out of the way in order not to obscure portions of the machine shown in FIGS. 1–4, was moved back into operative position in which it conveys the boxes to the right; and FIG. 6 is a perspective view of the portion of the machine showing the heating device. In this view the observer has taken one step in the downstream direction and looks upstream.

In the following description and in the claims various details will be identified by specific names for convenience. The names, however, are intended to be generic in their application. Corresponding reference numerals refer to corresponding parts in the several figures of the drawings.

The drawings accompanying, and forming part of, this specification disclose certain specific details of construction for the purpose of explanation of broader aspects of the invention, but it should be understood that structural details may be modified in various respects without departure from the principles of the invention and that the invention may be practiced by other devices than specifically shown.

The device of machine portion shown in the drawings constitutes a portion of a larger packaging installation in which boxes are formed from flat blanks, are then filled with a product, whereafter the box cover is folded down over the box contents and the cover flaps are sealed to the box body, all in a straight line operation.

Structurally the box comprises a box body consisting of a bottom panel, two end wall panels, and a front and a rear wall panel. The wall panels are interconnected at the corners in a manner which is optional, for example, by corner flaps on certain wall panels which are inserted in slits in other panels. The cover panel is articulated to the box rear wall and comprises a cover front flap and two cover side flaps.

In order to seal the box the cover side flaps may first be folded down over the box body end walls and be bonded thereto, whereafter the box is turned 90 degrees about a vertical axis in order that a similar folding and bonding operation may be performed on the cover front flap which is bonded to the box front wall.

Only the bonding of the cover side flaps will be considered in describing the present method of heat bonding, it being understood that the front flap undergoes a similar procedure.

The paperboard from which the blanks are cut may be any of the common kinds of board, for example, sulphite board which is usually imprinted in several colors by a photolithographic process and is then coated to make it moisture or liquid resistant.

It is the custom of the United States box industry to define the thickness of the coating in terms of weight of coating applied per board area. A typical sulphite board which was used in the performance tests given further below had a high gloss wax coating of high melting point wax, the coating being a total of 7 pounds (3,180 grams, metric) per one thousand square feet (92.9 square meters, metric), four pounds being applied to the side of the board which is to become the box inside and three pounds to the opposite board surface which is to form the outside.

The char point of the board was found to be about 500 degrees F. (260 centigrade). When exposed to heat of that temperature the board first turned brown and then began to smoke.

Figure 1:
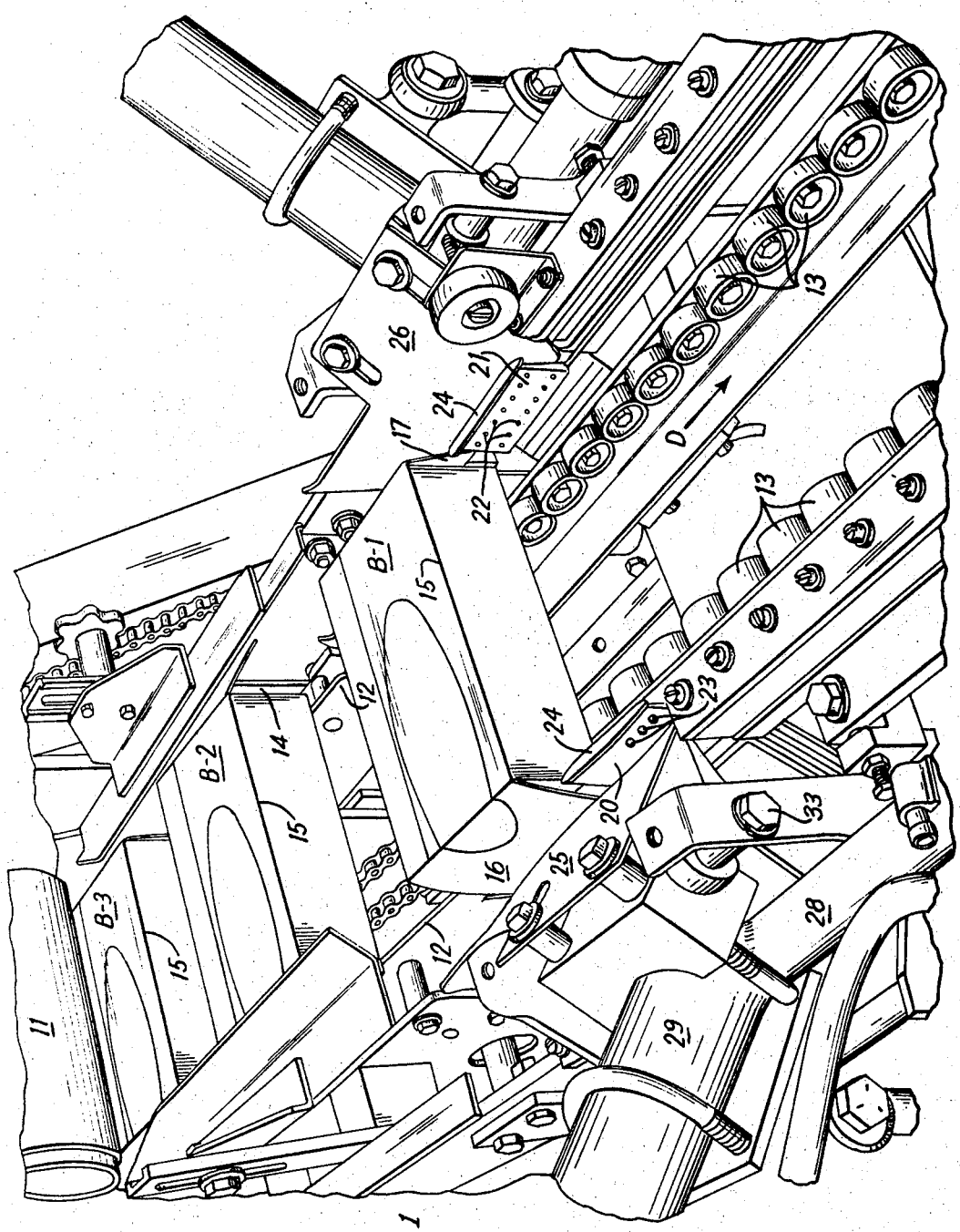
FIG. 1 is a perspective view of a conveyor track on which boxes to be sealed move towards the observer at a moment prior to application of heat thereto, the view being in the upstream direction.

In FIG. 1 filled boxes $B_1$ $B_2$ and $B_3$ emerge from under a box cover closing conveyor 11 and move towards the observer on a track on which the boxes travel first on rails 12 and then on rollers 13 and are laterally guided by suitable guides, one such guide, a plate, being visible at 14.

The boxes move in the direction of the arrow D with the cover hinges 15 leading. The cover side flaps 16 and 17 are folded over the box ends, but being still unbonded, flare out slightly and form an inverted V with respect to the box body end walls which they overlie.

The boxes are moved forward at a uniform continuous fast rate by an overhead conveyor. In FIGS. 1 to 4 the conveyor was swung out of sight in order to expose the track and the heating and closing elements. The overhead conveyor is best seen in FIG. 5 and comprises angular lugs 18 which hold the cover panels of the boxes down and propel the boxes by engagement with the trailing box wall. The lug farthest to the left in FIG. 5 is about to engage its box and the lug farthest to the right is empty. There was no box at that position when the picture was taken from which the drawing is traced.

The overhead conveyor is of the endless type, the lugs moving into the path of the boxes at the left of FIG. 5 and withdrawing from the box track near the right of FIG. 5, at which point a chain conveyor 19 takes over to move the boxes farther.

Returning to FIG. 1 a pair of air discharge heads 20, 21 is seen just ahead of box $B_1$. The heads are of a horizontal cross section resembling that of an airfoil and have apertures in their vertical walls both on the side facing the box body, as seen at 22, and on the side facing the cover side flaps, as seen at 23.

Hot air is supplied to the heads 20 and 21 under pressure. Its discharge temperature is above the char point of the board. For example, a thermocouple inserted into one of the discharge apertures registered a temperature of 875 degrees F. (465° C.).

The heads 20 and 21 are each topped by a spacer fin protruding about $\frac{1}{16}''$ (1.6 mm.) from the surface of the head walls in which the discharge apertures are formed. The spacer fins 24 insure proper and uniform spacing of the box body and of the cover side flaps from the air discharge apertures and thus the maintenance of an even temperature. For this purpose there are further provided two guide plates 25, 26 whose lower edges engage the cover flaps and urge them towards the fins on the heads.

The passage of air to the discharge heads is best traced in FIG. 6 showing a flexible air duct 27 from a suitable compressor (not shown) to the entrance duct 28 of a generally cylindrical heat exchanger 29 containing a suitable electric resistance element past which the air flows. Cables 30 and 31 lead from the resistance element to a transformer 32 having taps which permit the heat output of the heating element to be increased or decreased by an appropriate change in the voltage applied thereto. The transformer of the illustrated example had taps or terminals yielding voltages of 65 v., 67.5 v., 70 v., 72.5 v. and so forth.

The illustrated air heater and applicator head form the subject matter of a copending patent application Ser. No. 435,221, filed Feb. 25, 1965, now Patent No. 3,336,464, dated Aug. 15, 1967.

Also seen in FIG. 6 is a servo-motor operated mechanism for moving the air discharge heads out of the path of boxes in the event the conveyors are ever stopped. Suffice it to say that the heat exchanger is pivotally mounted about a horizontal pivot bolt 33 partially obscured in FIG. 6 and best seen in FIG. 1. A cylinder-and-piston type servo-motor 34 attached to the heat exchanger at 35' may tilt the heat exchanger in a clockwise sense in the event of stoppage of the conveyors. In such an event the heads 20, 21 (FIG. 1) are withdrawn downwardly.

FIG. 2 shows the box $B_1$ at the moment hot air is being applied thereto. There are in essence two blasts or streams of air, one produced by apertures 22 being horizontally directed against the box body, a second produced by apertures 23 being upwardly slanted to impinge on the outwardly flared cover side panel substantially at right angles.

FIG. 3 shows the trailing portion of the cover side flap still being heated while the leading portion is being folded down into contact with the box end wall. This is accomplished by the curvature of the bottom edge of the guide plate 25 which leads the flap into engagement with lateral pressure rails 35, 36. These are best seen in FIG. 4 on the far side of the box B₁. Top rollers 37, 38 insure that the cover panel is properly folded down as the box enters between the compression rails along either cover flap of the box.

It may be noted that in FIGS. 1 and 2 the top roller 37 was removed as it would have obscured the discharge head 20.

Example I

Conveyor speed: 18″/sec. (45 cm./sec.);
Box spacing: 9″ (22.5 cm.);
Boxes per minute: 120;
Length of discharge head: 2¾″ (70 mm.);
Time of exposure of surface element to heat: 0.13 sec.;
Time from last exposure of surface element to heat until bonding contact: less than 0.1 sec.;
Heat input: 4,500 watts;
Air volume: 2.6 cu. ft./min. (74 l./min.);
Air discharge temperature: 875 degrees F. (465° C.) (measured in aperture);
Temperature of discharged air ¹⁄₁₆″ (1.6 mm.) from aperture: 675 degrees F. (350° C.). This temperature was measured to determine the loss of heat due to cooling-by-expansion.

*Results.*—A very satisfactory bond was obtained on all boxes.

Example II

Conveyor speed: 24″/sec. (60 cm./sec.);
Box spacing: 9″ (22.5 cm.);
Boxes per minute: 160;
Length of discharge head: 2¾″ (70 mm.);
Time of exposure of surface element to heat: 0.1 sec.;
Time from last exposure of surface element to heat until bonding contact: less than 0.08 sec.;
Heat input: 4,500 watts;
Air volume: 2.6 cu. ft./min. (74 l./min.);
Air discharge temperature: 875 degrees F. (465° C.).

*Result.*—Same as in Example I.

Example III

Conveyor speed: 31.5″ sec. (75 cm./sec.);
Box spacing: 9″ (22.5 cm.);
Boxes per minute: 210;
Length of discharge head: 2¾″ (70 mm.);
Time of exposure of surface element to heat: 0.08 sec.;
Time from last exposure of surface element to heat until bonding contact: less than 0.06 sec.;
Heat input: 4,700 watts;
Air volume: 2.6 cu. ft./min. (74 l./min.);
Air discharge temperature: 900 degrees F. (480° C.).

*Results.*—A secure commercially acceptable bond was obtained on all boxes.

The foregoing tests justify the conclusion that even higher conveyor speeds and a correspondingly higher box output can be obtained, particularly since it was possible to raise the air discharge temperature over 900 degrees by using a higher voltage tap of the transformer for the heating element. Since, however, the box forming equipment was not arranged to operate at higher speeds, the test was concluded.

Supplementary tests were conducted to determine the effect of delayed folding of the heated box portions into bonding contact. It was found that a time delay equivalent to more than the distance of the point of panel to panel contact from the end of the discharge head, or a time delay greater than the time of exposure of any given surface element of the box portions to heat leads to inferior results in that more than 2 percent of the seals produced are of less than commercially acceptable strength.

What we claim is:

1. The method of bonding in overlapping box closing position an inner and an outer wall panel of a folding box of paperboard having a coating of thermoplastic material on opposite surfaces of said panels, the method comprising, discharging a continuous stream of hot air having a discharge temperature above the char point of the paperboard; advancing at a substantially uniform speed, and in continuous motion, said box past said stream to permit the stream to impinge on both said panels to soften the coating thereon, the box being in a condition in which the inner wall panel is in box closing position and the outer wall panel extends at an angle to said inner panel, the advance of the box being in the direction of the hinge line of the outer panel, both said panels being sufficiently close to said stream that the temperature of the air of the stream at the point of impact on said panels is above the char point, the linear rate of speed of advance being in excess of that rate at which the coating on the opposite panel side would melt as the result of penetration through the respective panel of the heat applied by said stream; and immediately thereafter folding the outer panel into bonding contact with said inner panel.

2. The method of bonding in overlapping box closing position an inner and an outer wall panel of a folding box of paperboard having a coating of thermoplastic material on opposite surfaces of said panels, the method comprising, discharging a continuous stream of hot air having a discharge temperature above the char point of the paperboard; advancing at a substantially uniform speed, and in continuous motion, said box past said stream to permit the stream to impinge on both said panels to soften the coating thereon, the box being in a condition in which the inner wall panel is in box closing position and the outer wall panel extends at an angle to said inner panel, the advance of the box being in the direction of the hinge line of the outer panel, both said panels being sufficiently close to said stream that the temperature of the air of the stream at the point of impact on said panels is above the char point, the linear rate of speed of advance being in excess of that rate at which the coating on the opposite panel side would melt as the result of penetration through the respective panel of the heat applied by said stream; and folding said outer panel into bonding contact with said inner panel within less time from the last moment of exposure of any given point of said outer panel to said stream than the total time of exposure to said stream of said outer panel of said given point.

3. The method of bonding in overlapping position two portions of a paperboard blank having a coating of thermoplastic material on opposite surfaces of at least said portions, the method comprising, discharging a continuous stream of hot air having a discharge temperature above the char point of the board to be bonded; advancing at a substantially uniform speed, and in continuous motion, said portions to be bonded in a direction substantially of the plane of the portions and first folding said portions into an inverted V position and then passing the folded portions through said stream so that the stream impinges on the inside of the V and softens the said coating thereon, the air temperature of the stream at the point of impact on said coating being above said char point, the linear rate of speed of advance being in excess of that rate at which the coating on the opposite board side, which is the outside of the V, would melt as the result of penetration of the board by the heat applied by said stream; and immediately thereafter folding into bonding contact the two surfaces to which hot air was directly applied.

4. The method of bonding in overlapping position two portions of a paperboard blank having a coating of thermoplastic material on opposite surfaces of at least said portions, the method comprising, discharging a continuous stream of hot air having a discharge temperature above the char point of the board to be bonded; advancing at a substantially uniform speed, and in continuous motion, said portions to be bonded in a direction substantially of the plane of the portions and first folding said portions into an inverted V position and then passing the folded portions through said stream so that the stream impinges on the inside of the V and softens the said coating thereon, the air temperature of the stream at the point of impact on said coating being above said char point, the linear rate of speed of advance being in excess of that rate at which the coating on the opposite board side, which is the outside of the V, would melt as the result of the heat applied by said stream penetrating the board; and folding the two portions into bonding contact of their two surfaces to which hot air was directly applied within less time from the last moment of exposure of any given point of said last named surfaces to said stream, than the total time of exposure to said stream of the board at said given point.

References Cited
UNITED STATES PATENTS

| | | | |
|---|---|---|---|
| 3,249,024 | 5/1966 | Shiu | 156—497 XR |
| 3,300,350 | 1/1967 | Flynn | 156—82 |
| 3,207,049 | 9/1965 | Monroe et al. | 156—497 XR |

PHILIP DIER, *Primary Examiner.*

U.S. Cl. X.R.

156—82, 497